United States Patent [11] 3,578,836

[72] Inventor William J. Hannan
 Pennington, N.J.
[21] Appl. No. 767,991
[22] Filed Oct. 16, 1968
[45] Patented May 18, 1971
[73] Assignee RCA Corporation

[54] RETRIEVAL OF HOLOGRAPHICALLY RECORDED DATA
 3 Claims, 1 Drawing Fig.
[52] U.S. Cl. .................................................. 350/3.5,
 355/2, 355/40
[51] Int. Cl. ..................................................... G03b 27/10,
 G03b 27/32
[50] Field of Search........................................... 350/3.5;
 355/27, 53, 100, 2 (x), 40 (x)—43; 353/25, 27

[56] References Cited
 UNITED STATES PATENTS
 3,264,961 8/1966 Tuttle et al. ................... 355/27X
 3,277,776 10/1966 Harris........................... 355/27X
 3,410,203 11/1968 Fischbeck ..................... 350/3.5UX Primary Examiner—David Schonberg
Assistant Examiner—Robert L. Sherman
Attorney—H. Christoffersen ABSTRACT: A two-step process for retrieving holographically recorded pages of information. In the first step, a low power laser is employed to reconstruct the image stored in a small hologram and to record this image in a small area of recording medium. In the second step, a high power incoherent light source and optical means are employed to derive from the small image an enlarged hard copy.

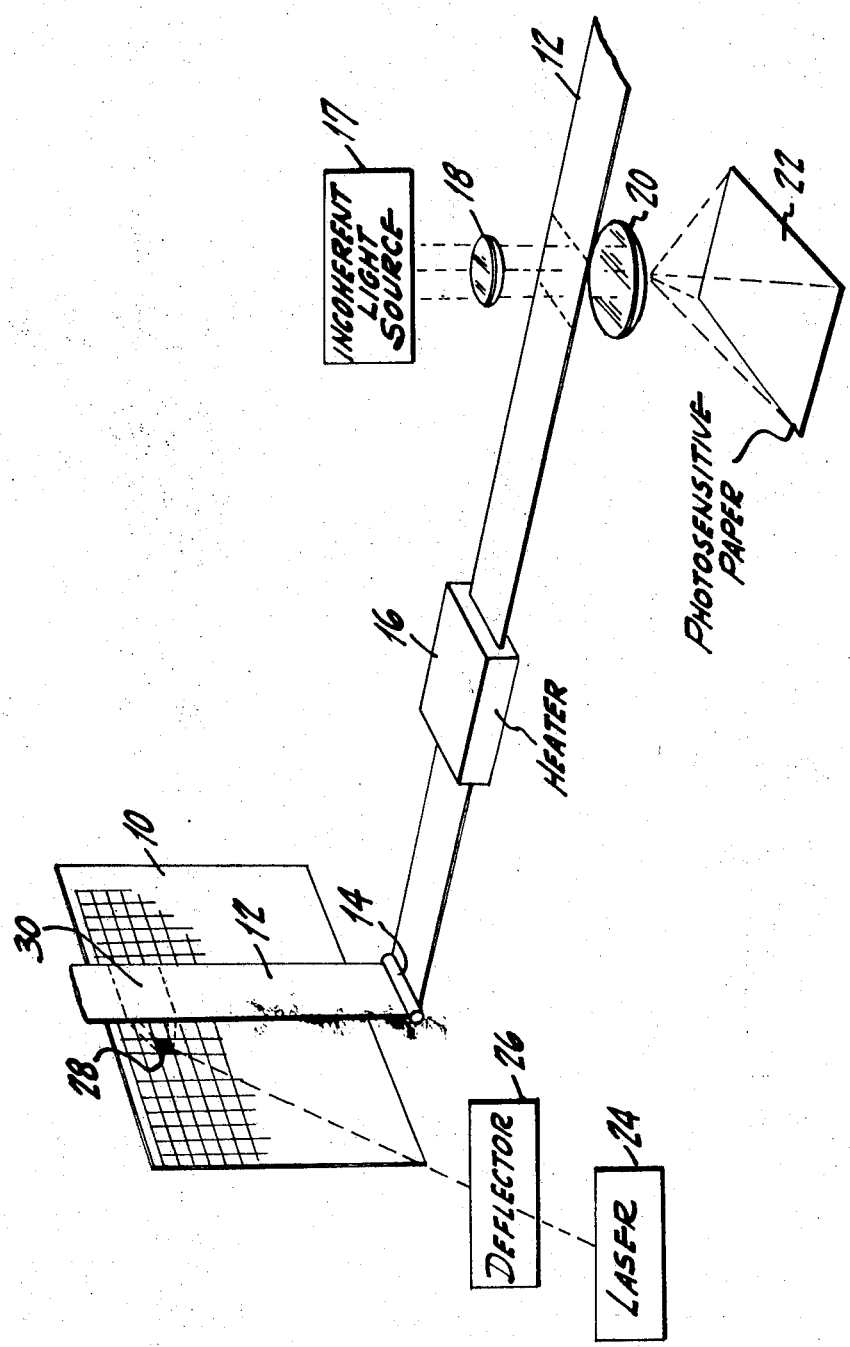

RETRIEVAL OF HOLOGRAPHICALLY RECORDED DATA

BACKGROUND OF THE INVENTION

Holographic recording for data storage and retrieval has a number of inherent advantages. To start with, a tremendous amount of information can be stored in a very small space. For example, 500 pages, each the size of a page in a technical journal such as the Proceedings of the IEEE, easily can be stored on a single sheet about the size of a post card, as 500 holograms, each occupying only several square millimeters. In addition, this information can be recorded with a high degree of redundancy, enabling the holograms to be scratched, spotted with dirt and otherwise mutilated without serious loss of information. Other advantages include the ability to employ, as the storage medium, a plastic such as vinyl, and to press phase holograms into the vinyl, employing the same low cost techniques as are used to replicate hi-fi phonograph records and so on.

While the direct optical read out of holograms provides clear images, most people prefer to read hard copy. This may be due to the fact that the average person is accustomed to reading books and newspapers but, even if this were not so, there would be many situations in which hard copy would be preferred to the temporary image produced by an optical reader.

It would appear, on first consideration, that hard copy could be produced from a hologram simply by projecting the reconstructed holographic image on a suitable photosensitive medium as, for example, is suggested in U.S. Pat. No. 2,982,176, issued May 2, 1961 to Kay. Unfortunately, this is not a practical approach.

The reconstruction of the image stored as a hologram requires a coherent light source such as a laser. A laser in a price class sufficiently attractive that it is suitable for use in a practical system may have an output of only 2 milliwatts. If a hologram is read out by such a laser and a reasonable size image, say 25 centimeters × 20 centimeters, is projected onto a photosensitive paper, the power density on the paper is only $4 \times 10^1$ watts per square centimeter. The energy needed to expose the most sensitive low-cost paper such as 3M Brand Dry-Silver paper is $4 \times 10^{14}$ joules per square centimeter. This means that the exposure time required would be of the order of $1 \times 10^3$ seconds per exposure which, of course, is much too long for any practical system.

The exposure time could be shortened, of course, by using a more powerful laser. But achieving practical exposure times with this approach would require a laser so powerful that it would be prohibitively expensive for most applications. Another approach is to employ more sensitive photographic paper. However, there is no paper known which is sufficiently sensitive to reduce the exposure time to a matter of seconds. And even if there were, the high cost of such special paper would make the system too expensive to be practical.

The object of the present invention is to provide a practical system for retrieving information stored holographically, that is, a system of relatively low cost and relatively high speed.

SUMMARY OF THE INVENTION

In accordance with the invention, information is stored as holograms of relatively small size. A hologram selected for read out is illuminated by a low power laser and the reconstructed image thereby obtained is recorded on a relatively small area of recording medium so that the power density at recording medium is relatively high. After undergoing the development process, which may be a simple heating operation for dry-silver material, the recorded image is illuminated by a relatively high-power incoherent light source and a magnified image is projected onto a recording medium.

BRIEF DESCRIPTION OF THE DRAWING

The single FIGURE is a schematic showing of a preferred form of the invention.

DETAILED DESCRIPTION

In the system of the invention, several hundred holograms are stored on the storage medium 10. For purposes of the present explanation, the storage medium 10 is assumed to be opaque and the reconstructed image formed by reflected light. However, it is to be understood that the invention is equally suitable for use with a transparent storage medium 10 in which case the images may be reconstructed by projecting light through the film. Each hologram may occupy a very small area such as 2 millimeters × 2 millimeters and may, for example, represent a page of a book or the like.

The film 12 is preferably made of Dry-Silver or similar material that can be heat developed. It may be driven by a drive system, not shown. The film 12 passes over a roller 14 and into a heater 16. The purpose of the latter is to develop and fix the film.

An incoherent light source 17 and optical system illustrated by the single lens 18, applies light at a relatively high power level to the film. An optical system illustrated by the single lens 20 projects an enlarged image derived from the film 12 onto a sheet of photosensitive paper 22.

In the operation of the system of the invention, a coherent light source, such as laser 24, produces light at a wavelength suitable for reconstructing a hologram image. The beam of light is deflected by the deflector 26 to a hologram of interest, shown as a darkened area 28 for purposes of the present description. The deflector 26 may be mechanical or electronic in nature, both types being well known in the art.

The film 12 is so located that the reconstructed image produced when a hologram is illuminated is projected onto the film as indicated by the square 30 within the dashed lines. This square may be 6 millimeters × 6 millimeters, a relatively small area. It is to be understood that regardless of the location of the hologram on the storage medium 10, it will be projected onto the same location of the film, provided that the storage medium is initially prepared in the manner described, for example, in "Hologram Memory System," application Ser. No. 515,531, filed Dec. 22, 1965 (now abandoned) by R. S. Mezrich, et al. and assigned to the same assignee as the present application.

After a relatively short exposure time, the laser may be turned off and the film advanced. The laser then may be turned on again with the beam deflected to another location to reconstruct the image of another hologram on the film 12. The process may be repeated for as many pages of hard copy as are needed.

The reconstructed images on the film, in due course, pass into the heater 16 where they are developed and fixed. Thereafter, the fixed image passes beneath the incoherent light source 17 and lens 18 where each image is illuminated by the relatively high-power incoherent light source. The enlarged image produced by the optical system 20 is projected onto a relatively large area of photosensitive paper as, for example, an area of 25 centimeters × 20 centimeters. The paper then may be developed and fixed in conventional manner to produce the enlarged hard copy.

The power required to produce the 6 millimeter × 6 millimeter image is relatively low and the exposure time is relatively short. Using the same example as in the introductory portion of this application, assume the laser output power to be 2 milliwatts. This provides a power density of about $5 \times 10^{14}$ watts per square centimeter on the film 12. This is more than a thousand times higher than the power density which would be possible if the laser were employed to produce a 25×20 centimeters image directly. The exposure time required for the 6 millimeters × 6 millimeters image is less than 1 second.

The cost for making 6 millimeters × 6 millimeters photographs is very low. At the present time, a 200 foot roll of 16 millimeter dry-silver film costs less than $6.00. Accordingly, a 6 millimeter × 6 millimeter section of this film the size of the hologram image in the above example, costs only about 0.02 cents. An incoherent light source 17 for enlarging the 6 millimeters × 6 millimeters negative and exposing the photosensitive paper is relatively inexpensive and readily available. An ordinary 200 watt bulb used in a photographic enlarger would be suitable, for example. The exposure time here is relatively short and easily can be less than a second. The enlarged hard copy at 22 therefore can be made at the same time that the laser 24 is being employed to reconstruct an image from another hologram at 30.

It is to be understood, of course, that as is the usual practice, the film 12 is preferably moved intermittently. During the time the film is stationary, the enlargement is made at 22 and a new image is recorded at 30. Or, a film loop can be introduced to permit nonsynchronous operation.

I claim:

1. A method of storing and retrieving data comprising the steps of:
    storing the data in the form of holograms of relatively small size;
    illuminating one of said holograms with a coherent light source at a relatively low level of power to reconstruct the holographic image stored therein;
    recording said reconstructed image on a relatively small area of a recording medium;
    illuminating said recorded image with an incoherent light source at a relatively high level of power; and
    magnifying said illuminated image and projecting said magnified image onto a relatively large area of recording medium.

2. In the method set forth in claim 1, the recording of said reconstructed image requiring an interval of not greater than several seconds.

3. In the method set forth in claim 1, the illumination of said hologram being performed with a coherent source having a power of not more than a fraction of a watt.